Oct. 12, 1965     I. F. CLOUD, JR     3,211,828
PROTECTIVE AND LATCHING CLIP FOR WIRING HARNESS
Filed March 28, 1963
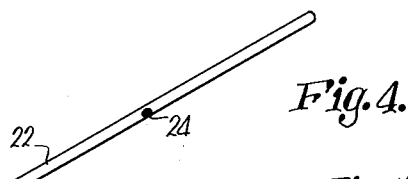
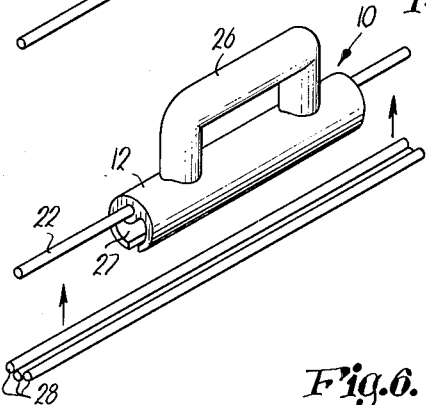
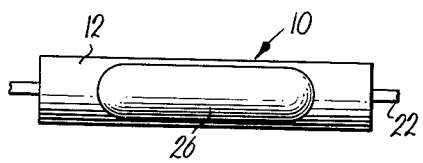
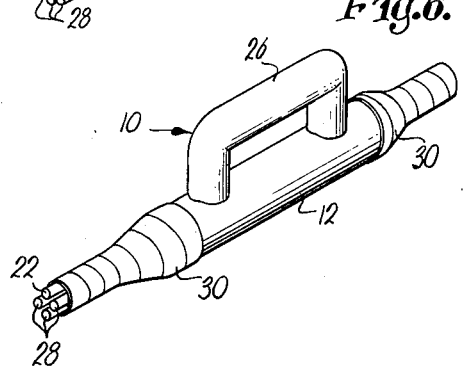
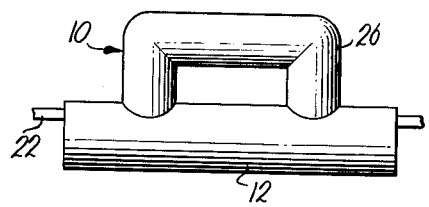
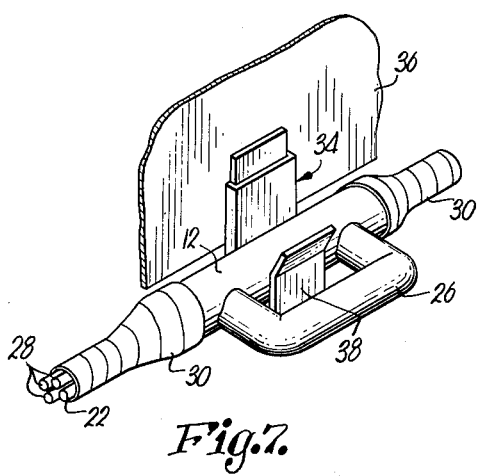
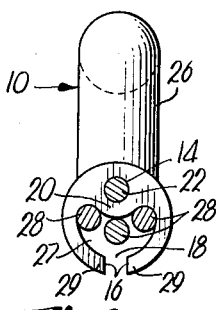
INVENTOR.
Ivan F. Cloud Jr.
BY
Hovey, Schmidt, Johnson & Hovey
ATTORNEYS.

United States Patent Office 3,211,828
Patented Oct. 12, 1965

3,211,828
PROTECTIVE AND LATCHING CLIP FOR
WIRING HARNESS
Ivan F. Cloud, Jr., Kansas City, Mo., assignor to Whitaker Cable Corporation, Kansas City, Mo., a corporation of Delaware
Filed Mar. 28, 1963, Ser. No. 268,610
4 Claims. (Cl. 174—72)

This invention relates to a retainer for use on a wiring harness employed on vehicles or the like, to permit rapid and positive securing of the harness to the vehicle body.

The invention further relates to an improved retainer permitting production of a harness at a minimum cost while at the same time, assuring placement of the retainer on the harness in a location such that the retainer may be secured to a clip on a supporting wall of the vehicle with all of the extremities of the wires of the harness located in proper relationship with respect to the electrical components of the vehicle to which they are to be connected.

In recent years, assembly line construction of various types of equipment has employed wiring harnesses for components which are in electrically interconnected relationship so that as the units are moved along the assembly line, it is not necessary for the assemblers to string individual wires from one electrically operated component to another. The harness may simply be secured to the unit being fabricated and the extremities of the wires coupled to the electrical components. In the assembly of automobiles, for example, the wiring harnesses may be of the order of 20 ft. or longer and, therefore, in order to properly secure the harness to the sheet metal of the vehicle, along a predetermined serpentine path, it is conventional to provide a number of wire securing clips which are placed on the vehicle at a time well prior to placement of the wiring harness thereon. However, in order to expedite securing of the harness to the vehicle so that the ends of the wires of the harness are located in proper relationship to the electrical components to which they are ultimately to be connected, it is necessary that the harness be secured to the clips therefor in a preselected location with respect to the vehicle body. If the workmen must first secure the ends of the wires of one extremity of the harness to the electrical components and then string the wires along the body, a much longer assembly time is required than if the harness is first secured in proper disposition on the body and then the extremities of the wires connected to the electrical components.

One way of assuring proper connection of the harness to the body of the vehicle is to provide retainers on the harness which can be secured to the connector clips previously provided on the body of the vehicle, but this procedure has not heretofore been entirely satisfactory because of the difficulty of properly locating the retainers on the wiring harness prior to positioning of the latter on the vehicle. The problem is complicated, of course, by the fact that the wires of the harness are not of the same length and are located with the extremities thereof in different relative positions. In the construction of the harness, the individual wires are normally affixed to a jig forming a part of a taping machine, which then wraps a tape around those portions of the wire which are normally in interengagement when the harness is secured to the vehicle body. For this reason, the retainer adapted to be secured to the positioning and retaining clip on the vehicle body must be of such nature that it does not in any way interfere with the operation of the taping machine and at the same time, permits accurate placement of the retainer in a predetermined location with respect to opposed extremities of the harness.

It is, therefore, the primary object of the present invention to provide a retainer for a wiring harness overcoming the problems above and which may be secured to a harness adapted to be wrapped on a conventional taping machine, is located in proper relationship with respect to the longitudinal length of the harness so that the latter may be secured to a vehicle body or the like by simply connecting the retainer to a previously provided securing clip on a panel of the vehicle, and which may be attached ot the harness at a proper location at a much lower cost than components of this general type heretofore used.

The clips generally employed to secure the wiring harness to the body of the vehicle usually are of U-shaped configuration adapted to receive a longitudinal taped length of the harness therebetween whereby the free leg of the clip may be forced over against the other leg to firmly secure the harness to the sheet metal panel. It is, therefore, a further important object of the invention to provide a novel protective and locating retainer as described above, which is adapted to be secured directly to the connector clip referred to, and which also serves the very important purpose of protecting the wires of the harness from being damaged by the securing clip on the vehicle body even if the free leg thereof is forced toward the opposite leg thereof to firmly secure the harness to the sheet metal panel.

Another very important object of the invention is to provide a protective and locating retainer for a wiring harness wherein construction of the harness is facilitated by utilization of one of the wires of the harness as a reference wire having a locating indicia thereon. In this manner, the retainer may be fixedly secured to the reference wire in predetermined location thereon prior to final assembly of the wires of the harness whereby wrapping of the latter in the usual taping machine may be carried out with the remaining wires of the harness being positioned in the required locations thereof with respect to the retainer, since all of the wires, including the reference wire having the retainer thereon, are affixed to the jig associated with the wrapping machine at the time of construction of the harness.

A still further object of the invention is to provide a novel retainer for use on a wiring harness of the type referred to above, wherein the retainer is adapted to be molded in a conventional injection molding machine, to the end that the protective and locating retainer may be molded about the reference wire in a manner so that the retainer is permanently affixed to the wire and cannot move with respect thereto, and also allowing the retainer assembly to be constructed at a minimum cost. In this respect, another important aim of the invention is to provide a molded retainer wherein a generally transversely C-shaped cavity may be molded in the body of the retainer for receiving the remaining wires of the harness so that a protective enclosue is provided around the wires of the harness at the point the latter is connected to the securing clip on the automobile body.

In the drawing:

FIGURE 1 is a plan view of the protective and retaining structure forming the present invention and showing the reference wire embedded therein and extending longitudinally thereof;

FIG. 2 is a side elevational view of the structure shown in FIG. 1;

FIG. 3 is an end elevational view of the structure shown in FIGS. 1 and 2 and illustrating the placement of a reference wire and a group of individual wires associated therewith within the tubular body of the structure;

FIG. 4 is a view of a reference wire having a guide indicia thereon for use in properly positioning the reference wire with respect to the tubular body;

FIG. 5 is a perspective view of the reference wire with the tubular body molded therearound and showing a U-shaped handle on the body for connecting the latter to a securing clip on a vehicle body or the like;

FIG. 6 is a view similar to FIG. 5 and illustrating the taped ends of the tubular body and a portion of the harness after all of the wires have been inserted therewithin; and FIG. 7 is a perspective view of the completed harness shown in FIG. 6 and illustrating the normal disposition thereof with a stationary support and a conventional U-shaped clip.

The present invention provides means for effectively constructing a wiring harness made up of a reference wire and a group of individual wires related directly to the reference wire in length and disposition. The structure for coupling the individual wires with the reference wire includes a tubular body of moldable material which is molded about the reference wire so as to embed the latter in the body.

The body is provided with a pair of opposed, longitudinally extending edges which define a slit clearing the individual wires to be joined or coupled with the reference wire. The ends of the body are then taped so as to draw the opposed edges together and thereby close the slit to clamp the individual wires together. A U-shaped handle forms a clip-receiving opening with the body so that the over-all structure, including the body, the harness and the handle, may be releasably coupled to a clip mounted on a stationary support.

Protective and retaining structure embodying the preferred concepts of the present invention is broadly denoted by the numeral 10 and has a tubular body 12 provided with a main body portion 20, and a pair of opposed, transversely arcuate legs 29 integral therewith and which cooperate with body portion 20 to define a generally C-shaped cavity 27. As is clear in FIG. 3, the longitudinally extending, transversely spaced margins 16 of legs 29 present a slit 18 therebetween extending the full length of body 12.

A generally U-shaped hanger 26 is provided on the outer surface of body portion 20 in direct opposition to slit 18 and extending longitudinally of structure 10 to permit suspension of the body 12 by hanger 26 from a clip generally designated 34 which may be provided on the metal panel 36 of a vehicle or the like.

The tubular body 12, as finally constructed, is provided with an elongated, longitudinally extending bore 14 therein for receiving a reference wire 22.

It is preferable that body 12 be formed by a conventional injection molding procedure utilizing synthetic resin material having a limited degree of resiliency so that the legs 29 may be deformed sufficiently to shift the edges 16 into interengagement to close the side of cavity 27.

During molding of structure 10, the reference wire 22 having a guide indicia 24 thereon, is disposed in the molding apparatus so that the body portion 20 is molded around a longitudinal section of wire 22 as indicated schematically in FIG. 5. To this end, the wire 22 is positioned in the injection molding apparatus so that the indicia 24 is substantially in the center of body portion 20 longitudinally thereof and with the body 20 tightly adhering to the wire so that structure 20 cannot subsequently move longitudinally of the reference wire.

The generally U-shaped hanger 26 integrally molded with body portion 20, defines a rectangular opening adapted to receive the free leg 38 of the hanger clip 34.

It is apparent that the hanger 26 may be formed separately from body 12 and suitably connected thereto by adhesive means or the like.

A plurality of the wires 28 are adapted to be received in the cavity 27 and they are normally inserted therein through the slit 18 between margins 16 of legs 29. However, it can be appreciated that the slit 18 may be omitted from body portion 20 and wires 28 inserted in cavity 27 through the open ends of the tubular body.

In the construction of the over-all harness unit, the reference wire 22 is initially cut to proper length. A spot of paint, serving as the reference indicia 24, is then placed on wire 22 in predetermined, spaced relationship from one extremity of the wire. The operator then places the wire between the two sections of the injection molding apparatus so that the sections close around the wire with the guide indicia 24 located centrally of the mold cavity. The synthetic resin material is then injected into the mold cavity whereby the molten substance flows around wire 22 in surrounding relationship to the portion thereof adjacent guide indicia 24. Upon solidification of the resin, the mold sections are separated and wire 22, having the retainer 10 molded therearound, is removed from the injection molding machine. It can be seen that the utilization of an injection molding process permits economical production of the retainer 10 with retention of the full insulating properties of wire 22.

Next, wire 22, as well as the remaining wires 28, are secured to a conventional wire harness jig associated with a harness taping machine. The extremities of the wires are secured to respective jig posts or connectors so that upon operation of the taping machine, a layer of tape 30 is wound around the wires 28 and reference wire 22 in a manner as shown in FIG. 6. The taping machine wraps the layer of tape 30 tightly around the wires and is further operable to wrap the tape around opposed extremities of body 12 with sufficient tension to effect flexure of legs 29 through a sufficient arc to bring the margin 16 into generally abutting relationship. In this manner, the tape 30 operates to releasably secure the wires 28 within cavity 27 and thereby protect the latter against damage from retaining clip 34, or similar securing components. The taping machine is operable in a conventional manner to discontinue the taping operation throughout the longitudinal length of hanger 26 but does not interfere with proper taping of opposed extremities of body 12.

The wiring harness is now fully assembled and ready to be connected to the apparatus having electrically operated components thereon by simply disposing the body 12 in clip 34 with the leg 38 thereof located in hanger 26, as indicated in FIG. 7. The leg 38 may be forced against the panel 36 of the apparatus receiving the wiring harness, if desired. Note in this respect, that if the leg 38 is forced into proximal relationship to panel 36, the legs 29 of tubular body 12 protect wires 28 from damage by clip 34.

The present protecting and retaining structure 10 has important utility in the construction of wiring harnesses for vehicle bodies wherein it is necessary that the group of wires be strung along substantially the full length of the vehicle chassis but with the individual extremities of the wires being located in proper disposition to be immediately secured to various electrically operated components of the vehicle. Utilization of the reference wire 22 absolutely assures that retaining structure 10 is located in disposition such that when the retainer is secured to clip 34 on the panel 36 of the vehicle body, the extremities of the wires will be at the exact required locations for connection to the electrical components of the vehicle.

Although only one protective and retaining structure has been illustrated in the drawings, it is to be recognized that a plurality of structures 10 will normally be provided along the longitudinal length of the wires of the harness, and in this respect, a plurality of guide indicia 24 will be used on the wire 22 and a corresponding number of synthetic resin retainers molded therearound.

Having thus described the invention, what is claimed as new and desired to be secured by Letters Patent is:

1. A wiring harness assembly for use on a vehicle having electrically operated components, said harness assembly comprising:

a U-clip adapted for attachment to said vehicle;

a plurality of elongated wires for joining respective electrically operated components of the vehicle, provided with one reference wire and arranged in predetermined relative relationship to said reference wire;

a protective and alignment member on said wires and provided with an elongated body portion of a length only slightly greater than the effective width of said U-clip and thereby of substantially less length than the harness, said body portion being permanently and securely affixed to said reference wire in surrounding relationship thereto at a predetermined area longitudinally of the latter, said clip receiving said body portion with the latter disposed with said area directly aligned with the clip, there being a generally U-shaped hanger on said body portion and projecting therefrom in embracing reationship to said clip to thereby preclude shifting of the member and thereby said wires relative to the clip, and a pair of self-sustaining, readily deformable, opposed leg portions on said body portion, integral therewith, of generally arcuate configuration transversely thereof and cooperable with the body portion to present an elongated, transversely arcuate cavity receiving the remaining wires of said harness therein, said leg portions having opposed end margins normally located in sufficiently close relationship to cause the leg portions to be disposed in full protecting relationship to said remaining wires and presenting a slit therebetween through which the remaining wires may be easily forced into said cavity as the leg portions bend during assembly of the harness; and means encircling all of the wires on each end of the member and binding all of the wires together for preventing relative longitudinal movement thereof.

2. A wiring harnes assembly as set forth in claim 1 wherein said encircling means comprises a layer of tape around the wires, said tape being around opposed ends of the member to maintain the leg portions of the member in protecting relationship to said remaining wires.

3. In a harness assembly for a plurality of wires adapted to be connected to certain electrical components of a vehicle:

a U-clip adapted for attachment to said vehicle; and a protective and alignment member having a main body portion adapted to be permanently and securely affixed to a reference wire of said plurality of wires in surrounding relationship to said reference wire and at a predetermined area longitudinally of the latter, said body portion being of a length only slightly greater than said clip and thereby of substantially less length than said reference wire, said clip receiving said body portion, there being a generally U-shaped hanger on said body portion embracing said clip and having a pair of spaced, parallel, leg sections projecting from the body portion and aligned with the longitudinal axis of the latter, said leg sections being located in spaced relationship from opposed ends of the body portion, and a pair of self-sustaining, readily deformable, opposed leg portions on said body portion, integral therewith, of generally arcuate configuration transversely thereof and cooperable with the body portion to present an elongated, transversely arcuate cavity for receiving the remaining wires therein, said leg portions having opposed end margins normally located in sufficiently close relationship to provide protection for the wires received in said cavity.

4. A wiring harness unit for use on a vehicle having electrically operated components and employing a U-clip for securing the harness to the body of the vehicle, said harness unit comprising:

a plurality of elongated wires for joining respective electrically operated components of the vehicle, provided with one reference wire and arranged in predetermined relative relationship to said reference wire;

a protective and alignment member on said wires and provided with an elongated body portion of a length only slightly greater than the effective width of said U-clip and thereby of substantially less length than the harness, said body portion being permanently and securely affixed to said reference wire in surrounding relationship thereto at a predetermined area longitudinally of the latter and which is adapted for direct alignment with the U-clip for receipt therein when the harness is mounted on said vehicle and the wires coupled to respective components, there being a generally U-shaped hanger on said body portion and projecting therefrom for disposition in embracing relationship to said clip to thereby preclude shifting of the member and thereby said wires relative to the clip, and a pair of self-sustaining, readily deformable, opposed leg portions on said body portion, integral therewith, of generally arcuate configuration transversely thereof and cooperable with the body portion to present an elongated, transversely arcuate cavity receiving the remaining wires of said harness therein, said leg portions having opposed end margins normally located in sufficiently close relaionship to cause the leg portions to be disposed in full protecting relationship to said remaining wires and presenting a slit therebetween through which the remaining wires may be easily forced into said cavity as the leg portions bend during assembly of the harness; and means encircling all of the wires on each end of the member and binding all of the wires together for preventing relative longitudinal movement thereof, said encircling means comprising a layer of tape around the wires, said tape being around opposed ends of the member to maintain the leg portions of the member in protecting relationship to said remaining wires.

References Cited by the Examiner

UNITED STATES PATENTS

| | | | |
|---|---|---|---|
| 2,064,290 | 12/36 | Campbell | 248—72 |
| 2,647,160 | 7/53 | Hood | 174—117 X |
| 2,795,641 | 6/57 | Rowell | 174—135 |
| 2,931,851 | 4/60 | Sims | 174—72 |

JOHN F. BURNS, *Primary Examiner.*

JOHN P. WILDMAN, LARAMIE E. ASKIN,
*Examiners.*